United States Patent
Kim et al.

(10) Patent No.: US 11,873,001 B2
(45) Date of Patent: Jan. 16, 2024

(54) RADAR CONTROLLER FOR VEHICLE AND METHOD THEREOF

(71) Applicants: HYUNDAI MOTOR COMPANY, Seoul (KR); KIA CORPORATION, Seoul (KR)

(72) Inventors: Eung Hwan Kim, Seoul (KR); Gyun Ha Kim, Incheon (KR); Sang Kyung Seo, Seoul (KR); Dae Yun An, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 241 days.

(21) Appl. No.: 17/321,838

(22) Filed: May 17, 2021

(65) Prior Publication Data

US 2022/0111856 A1    Apr. 14, 2022

(30) Foreign Application Priority Data

Oct. 8, 2020 (KR) .......................... 10-2020-0130389

(51) Int. Cl.
  *B60W 50/14* (2020.01)
  *B60W 30/08* (2012.01)
  *G06V 20/58* (2022.01)

(52) U.S. Cl.
  CPC ............ *B60W 50/14* (2013.01); *B60W 30/08* (2013.01); *G06V 20/58* (2022.01); *B60W 2050/146* (2013.01); *B60W 2420/52* (2013.01); *B60W 2540/01* (2020.02)

(58) Field of Classification Search
  CPC ................. B60W 50/14; B60W 30/08; B60W 2050/146; B60W 2420/52; B60W 2540/01; G06V 20/58; G01S 7/028; G01S 7/4021; G01S 13/04; G01S 13/886; G01S 2013/9315; G01S 2013/93274; G01S 13/931; G01S 7/4004; G01S 7/415; B60R 21/0134; B60R 21/0153; H01Q 1/325
  See application file for complete search history.

(56) References Cited

U.S. PATENT DOCUMENTS

| | | | |
|---|---|---|---|
| 10,106,153 B1* | 10/2018 | Xiao | G06F 18/24 |
| 2002/0003345 A1* | 1/2002 | Stanley | B60R 21/01532 |
| | | | 280/728.1 |
| 2018/0319291 A1* | 11/2018 | Dicanosa | B60Q 9/00 |
| 2020/0158864 A1* | 5/2020 | Achour | H01Q 1/3233 |

* cited by examiner

*Primary Examiner* — Isaac G Smith
*Assistant Examiner* — Nikki Marie M Molina
(74) *Attorney, Agent, or Firm* — MCDONNELL BOEHNEN HULBERT & BERGHOFF LLP (57) ABSTRACT

A radar controller for a vehicle and a method therefore are provided. The radar controller includes a radar that detects a passenger located inside the vehicle and an obstacle located outside the vehicle and a controller that determines sensitivity and a detection speed corresponding to an operation mode of the radar and controls the radar to operate at the determined sensitivity and the determined detection speed.

16 Claims, 6 Drawing Sheets

RADAR CONTROLLER FOR VEHICLE AND METHOD THEREOF

CROSS REFERENCE TO RELATED APPLICATIONS

This application claims the benefit of priority to Korean Patent Application No. 10-2020-0130389, filed in the Korean Intellectual Property Office on Oct. 8, 2020, the entire contents of which are incorporated herein by reference.

TECHNICAL FIELD

The present disclosure relates to technologies of controlling a radio detecting and ranging (radar) such that various convenience systems provided in the vehicle perform optimal performance.

BACKGROUND

Recently released vehicles have various convenience systems to provide users with various convenience services. For example, various convenience systems may include a rear occupant alert (ROA) system, a passenger position notification (PPN) system, a door edge protection system (DEPS), a collision avoidance system, an intrusion detection system, and the like.

Such various convenience systems separately have radars and provide various convenience services based on the detected results of the radars. In this case, the radar is optimized to be suitable for the use of the applied convenience system.

This causes duplication because various convenience systems should have a plurality of radars. There is a need for a method capable of efficiently controlling one radar such that various convenience systems perform optimal performance.

Details described in the background art are written to increase the understanding of the background of the present disclosure, which may include details rather than an existing technology well known to those skilled in the art.

SUMMARY

The present disclosure has been made to solve the above-mentioned problems occurring in the prior art while advantages achieved by the prior art are maintained intact.

An aspect of the present disclosure provides a radar controller for a vehicle for determining sensitivity and a detection speed corresponding to an operation mode (e.g., an interior detection mode or an exterior detection mode) of the radar provided in the vehicle and controlling the radar based on the determined sensitivity and the determined detection speed to use one radar for various purposes and a method thereof.

The technical problems to be solved by the present disclosure are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

According to an aspect of the present disclosure, a radar controller for a vehicle may include a radar that detects a passenger located inside the vehicle and an obstacle located outside the vehicle and a controller that determines sensitivity and a detection speed corresponding to an operation mode of the radar and controls the radar to operate at the determined sensitivity and the determined detection speed.

In an embodiment of the present disclosure, the radar may include an antenna for interior detection that includes at least one transmit antenna and at least one receive antenna and an antenna for exterior detection that includes at least one transmit antenna and at least one receive antenna.

In an embodiment of the present disclosure, the controller may enable the antenna for interior detection, when operating the radar in interior detection modes, and may enable the antenna for exterior detection, when operating the radar in exterior detection modes.

In an embodiment of the present disclosure, the controller may enable all transmit antennas and all receive antennas provided in the antenna for interior detection, when operating the radar in a rear occupant alert (ROA) mode among the interior detection modes, and may control the radar to detect a passenger at a detection speed of a first level using a full bandwidth.

In an embodiment of the present disclosure, the controller may enable all transmit antennas and all receive antennas provided in the antenna for interior detection, when operating the radar in a passenger position notification (PPN) mode among the interior detection modes, and may control the radar to detect a position of a passenger at a detection speed of a second level using a full bandwidth.

In an embodiment of the present disclosure, the controller may enable some of transmit antennas and receive antennas provided in the antenna for exterior detection, when operating the radar in a high-speed mode among the exterior detection modes, and may control the radar to detect an obstacle at a detection speed of a third level using a partial bandwidth.

In an embodiment of the present disclosure, the controller may enable some of transmit antennas and receive antennas provided in the antenna for exterior detection, when operating the radar in a low-speed mode among the exterior detection modes, and may control the radar to detect an obstacle at a detection speed of a second level using a partial bandwidth.

In an embodiment of the present disclosure, the controller may operate the radar in the interior detection modes, when a door of the vehicle is opened and closed.

According to another aspect of the present disclosure, a radar control method for a vehicle may include determining, by a controller, sensitivity and a detection speed corresponding to an operation mode of a radar and operating, by the controller, the radar at the determined sensitivity and the determined detection speed.

In an embodiment of the present disclosure, the operating of the radar may include enabling the antenna for interior detection, when operating the radar in an interior detection mode, and enabling the antenna for exterior detection, when operating the radar in an exterior detection mode.

In an embodiment of the present disclosure, the enabling of the antenna for interior detection may include enabling all transmit antennas and all receive antennas provided in the antenna for interior detection and controlling the radar to detect a passenger at a detection speed of a first level using a full bandwidth.

In an embodiment of the present disclosure, the enabling of the antenna for interior detection may include enabling all transmit antennas and all receive antennas provided in the antenna for interior detection and controlling the radar to detect a position of a passenger at a detection speed of a second level using a full bandwidth.

In an embodiment of the present disclosure, the enabling of the antenna for exterior detection may include enabling some of transmit antennas and receive antennas provided in the antenna for exterior detection and controlling the radar to detect an obstacle at a detection speed of a third level using a partial bandwidth.

In an embodiment of the present disclosure, the enabling of the antenna for exterior detection may include enabling some of transmit antennas and receive antennas provided in the antenna for exterior detection and controlling the radar to detect an obstacle at a detection speed of a second level using a partial bandwidth.

According to another aspect of the present disclosure, a radar controller for a vehicle may include a radar that includes an antenna for interior detection including at least one transmit antenna and at least one receive antenna and an antenna for exterior detection including at least one transmit antenna and at least one receive antenna, a table storing sensitivity and a detection speed of the radar for each of a rear occupant alert (ROA) mode and a passenger position notification (PPN) mode among interior detection modes and each of a high-speed mode and a low-speed mode among exterior detection modes, the ROA mode, the PPN mode, the high-speed mode, and the low-speed mode being operation modes of the radar, and a controller that enables the antenna for interior detection, when operating the radar in the interior detection modes, enables the antenna for exterior detection, when operating the radar in the exterior detection modes, and controls the sensitivity and the detection speed of the radar based on the table.

In another embodiment of the present disclosure, the controller may enable all transmit antennas and all receive antennas provided in the antenna for interior detection, when operating the radar in the ROA mode, and may control the radar to detect a passenger at a detection speed of a first level using a full bandwidth.

In another embodiment of the present disclosure, the controller may enable all transmit antennas and all receive antennas provided in the antenna for interior detection, when operating the radar in the PPN mode, and may control the radar to detect a position of a passenger at a detection speed of a second level using a full bandwidth.

In another embodiment of the present disclosure, the controller may enable some of transmit antennas and receive antennas provided in the antenna for exterior detection, when operating the radar in the high-speed mode, and may control the radar to detect an obstacle at a detection speed of a third level using a partial bandwidth.

In another embodiment of the present disclosure, the controller may enable some of transmit antennas and receive antennas provided in the antenna for exterior detection, when operating the radar in the low-speed mode, and may control the radar to detect an obstacle at a detection speed of a second level using a partial bandwidth.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
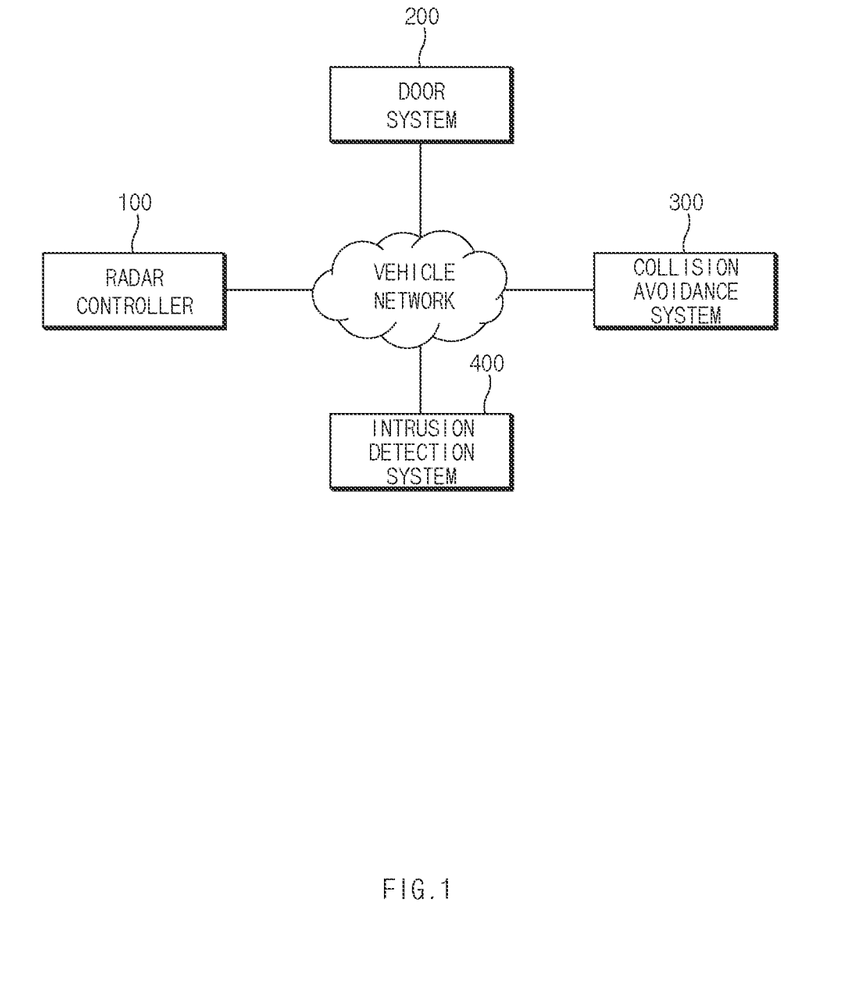
FIG. 1 is a block diagram illustrating a vehicle system to which a radar controller for a vehicle is applied according to an embodiment of the present disclosure.

FIG. 1 is a block diagram illustrating a vehicle system to which a radar controller for a vehicle is applied according to an embodiment of the present disclosure.

As shown in FIG. 1, the vehicle system to which the radar controller for the vehicle is applied according to an embodiment of the present disclosure may be a module for performing various functions based on a detection result of a radar, which may include, for example, a radar controller 100, a door system 200, a collision avoidance system 300, and an intrusion detection system 400. In addition, such a vehicle system may further include various systems such as a rear occupant alert (ROA) system, a passenger position notification (PPN) system, and a door edge protection system (DEPS).

Such respective components may be connected to each other over a vehicle network and may transmit and receive data over the vehicle network. In this case, the vehicle network may include a controller area network (CAN), a controller area network with flexible data-rate (CAN FD), a local interconnect network (LIN), FlexRay, media oriented systems transport (MOST), an Ethernet, or the like.

The radar controller 100, which is the subject matter, may determine sensitivity and a detection speed corresponding to an operation mode (e.g., an interior detection mode or an exterior detection mode) of a radar provided in a vehicle and may control the radar based on the determined sensitivity and the determined detection speed.

The door system 200 may lock or unlock a door of the vehicle and may detect the opening or closing of the door. Such a door system 200 may transmit door lock/unlock information of the vehicle and opening and closing information of the door over the vehicle network.

The collision avoidance system 300 may be a system which predicts a collision with an obstacle (e.g., a pedestrian, an object, or the like) based on the radar and controls a behavior of the vehicle to avoid the collision with the obstacle, which may control braking and steering of the vehicle and may control rising and falling of the suspension.

The intrusion detection system 400 may detect a person which intrudes into the vehicle based on the radar and may warn a user that an unauthorized person intrudes into the vehicle.

Figure 2:
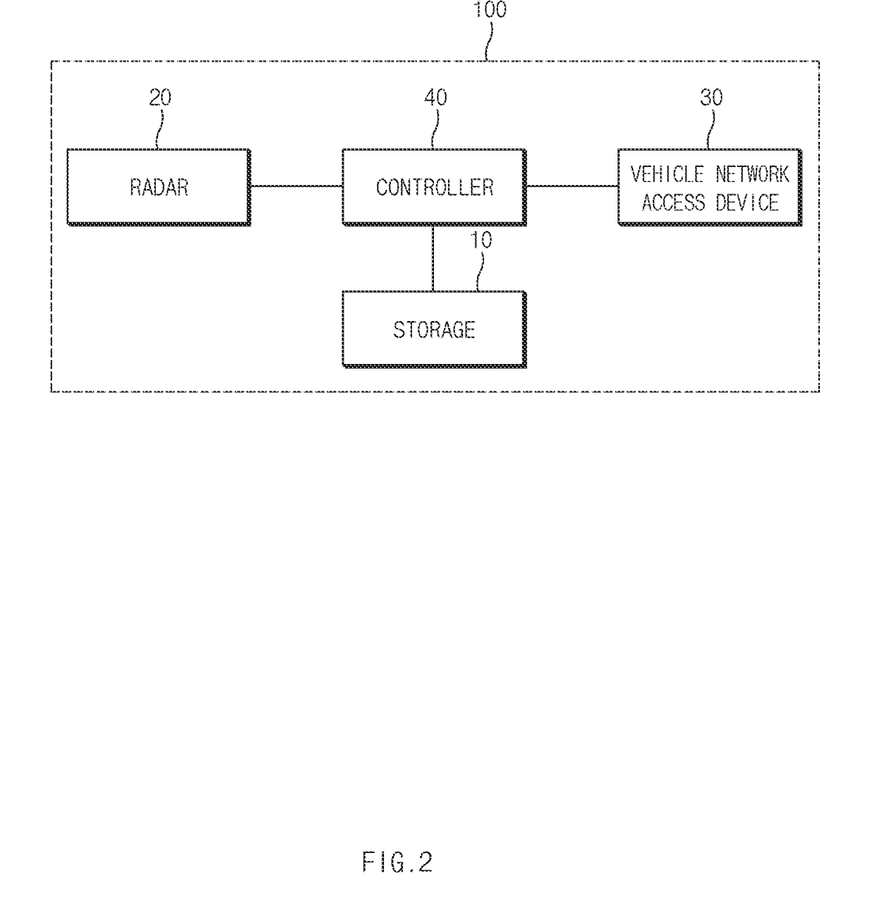
FIG. 2 is a block diagram illustrating a configuration of a radar controller for a vehicle according to an embodiment of the present disclosure.

FIG. 2 is a block diagram illustrating a configuration of a radar controller for a vehicle according to an embodiment of the present disclosure.

As shown in FIG. 2, a radar controller 100 for a vehicle according to an embodiment of the present disclosure may include a storage 10, a radar 20, a vehicle network access device 30, and a controller 40. In this case, the respective components may be combined into one component and some components may be omitted, depending on a manner which executes the radar controller 100 for the vehicle according to an embodiment of the present disclosure.

Seeing the respective components, first of all, the storage 10 may store various logics, algorithms, and programs required in a process of determining sensitivity and a detection speed corresponding to an operation mode (e.g., an interior detection mode or an exterior detection mode) of the radar 20 provided in the vehicle and controlling the radar 20 based on the determined sensitivity and the determined detection speed.

The storage 10 may store a table in which sensitivity and a detection speed corresponding to the operation mode are recorded. For example, the table is shown in Table 1 below.

applied when the distance between the vehicle and the object is gently reduced (e.g., when a pedestrian approaches). In the low-speed mode, the controller 40 may control the radar 20 to detect an object at a detection speed of a second level using the partial bandwidth.

The detection speed of the first level in Table 1 above may refer to a frequency where a radio wave transmission period is very long, and the detection speed of the third level may refer to a frequency where the radio wave transmission period is very short.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The radar 20 may be a sensor capable of detecting motion of a passenger (or an animal) in a field of view (FOV) inside the vehicle or detecting motion of an object (or a pedestrian) in an FOV outside the vehicle, which may include an antenna for interior detection of the vehicle and an antenna for exterior detection of the vehicle. In this case, the antenna for interior detection and the antenna for exterior detection may have the same structure.

Figure 3A:
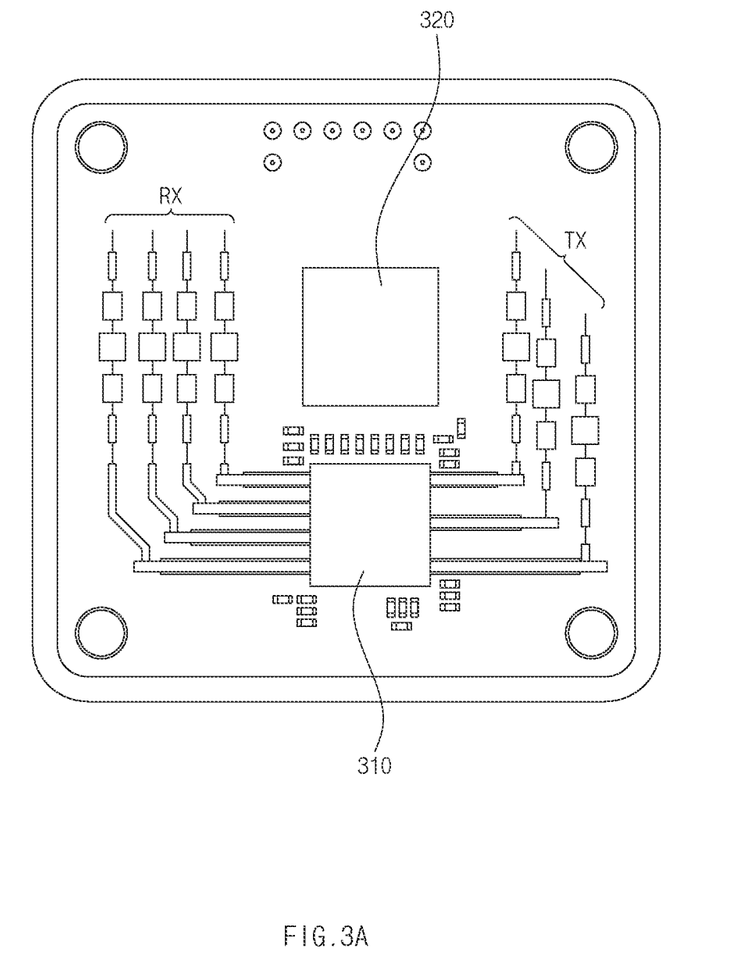
FIG. 3A a drawing illustrating a structure of a radar provided in a radar controller for a vehicle according to an embodiment of the present disclosure.

FIG. 3A a drawing illustrating a structure of a radar provided in a radar controller for a vehicle according to an embodiment of the present disclosure.

As shown in FIG. 3A, a radar 20 provided in the radar controller for the vehicle according to an embodiment of the present disclosure may include an antenna for interior detection, an antenna for exterior detection, and a micro control unit (MCU) 320.

The antenna for interior detection may be located on an upper surface of a printed circuit board (PCB) and may include three transmit (TX) antennas, four receive (RX) antennas, and a transceiver 310. In this case, the number of TX antennas and the number of RX antennas may vary with an intention of a designer.

TABLE 1

| Operation mode | Detailed mode | Sensitivity | Detection speed |
| --- | --- | --- | --- |
| Interior detection mode | ROA mode | Full Bandwidth | First level (minimum) |
| | PPN mode | Full Bandwidth | Second level |
| Exterior detection mode | High-speed mode | Partial Bandwidth | Third level (maximum) |
| | Low-speed mode | Partial Bandwidth | Second level |

Herein, the rear occupant alert (ROA) mode may be a precise detection mode. In the ROA mode, the controller 40 may control the radar 20 to detect an infant (or a companion animal) at a minimum detection speed using a full bandwidth. The passenger position notification (PPN) mode may be a precise detection mode. In the PPN mode, the controller 40 may control the radar 20 to detect a position of a passenger at a detection speed of a second level using the full bandwidth. The high-speed mode may be a mode applied when a distance between the vehicle and an object is sharply reduced (e.g., when a moving body (e.g., a vehicle, a motorcycle, or the like) approaches at a high speed or when the vehicle approaches a fixed object (e.g., a wall, a structure, or the like) at a high speed). In the high-speed mode, the controller 40 may control the radar 20 to detect an object at a detection speed of a maximum level using a partial bandwidth. The low-speed mode may be a mode The antenna for exterior detection may be located on a lower surface of the PCB in the same structure as the antenna for interior detection.

The MCU 320 may be electrically connected with the transceiver 310 of the antenna for interior detection and a transceiver (not shown) of the antenna for exterior detection and may enable or disable each transceiver under control of a controller 40 of FIG. 2.

The MCU 320 may control each transceiver to enable or disable the TX antenna and the RX antenna. In other words, the transceiver may selectively enable or disable the TX antenna and the RX antenna.

Figure 3B:
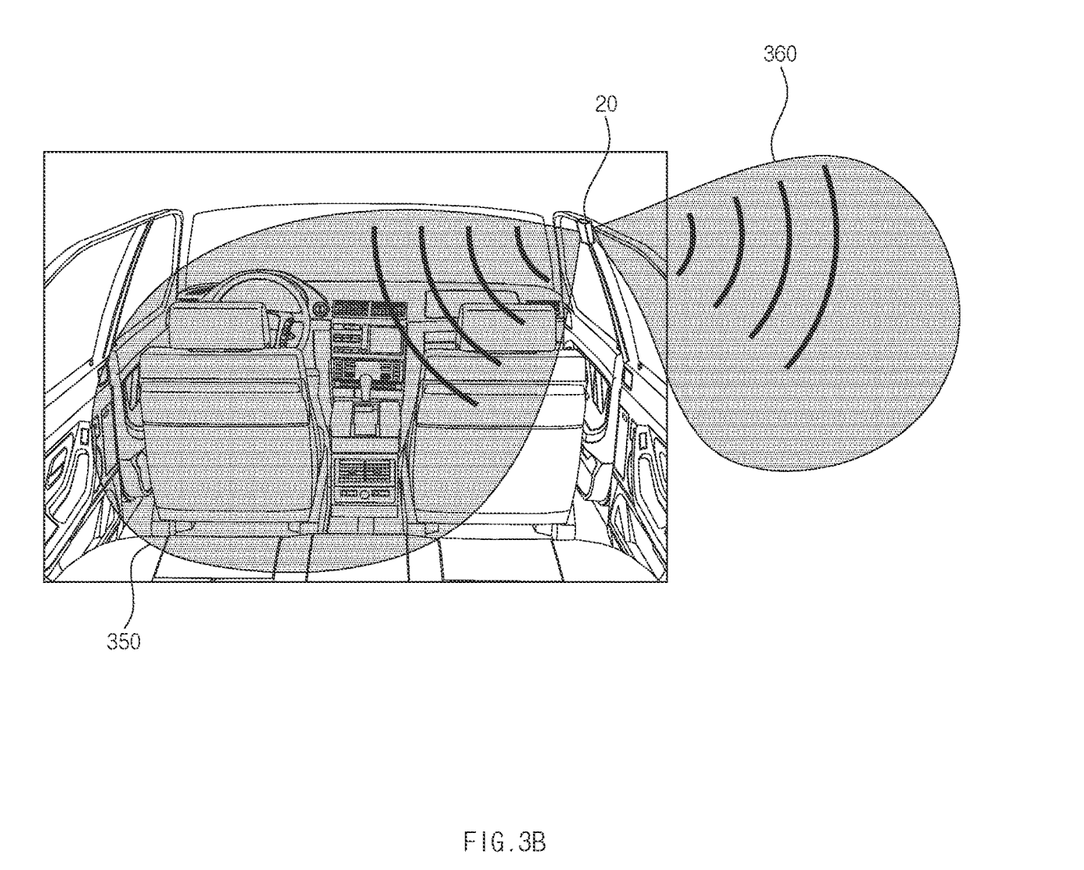
FIG. 3B a drawing illustrating a detection area of a radar provided in a radar controller for a vehicle according to an embodiment of the present disclosure.

FIG. 3B a drawing illustrating a detection area of a radar provided in a radar controller for a vehicle according to an embodiment of the present disclosure.

As shown in FIG. 3B, a radar 20 provided in the radar controller for the vehicle according to an embodiment of the present disclosure may be mounted on, for example, a center pillar upper trim of a vehicle to detect a passenger located inside the vehicle and detect an object (or a pedestrian) located outside the vehicle. Reference numeral '350' in FIG. 3B denotes a detection area of an antenna for interior detection provided in the radar 20, and reference numeral '360' denotes a detection area of an antenna for exterior detection provided in the radar 20.

Meanwhile, a vehicle network access device 30 of FIG. 2 may be a module which provides an access interface with a vehicle network, which may transmit a variety of information or data to the vehicle network under control of a controller 40 of FIG. 2 or may obtain a variety of information or data from the vehicle network under control of the controller 40.

The controller 40 may perform the overall control such that respective components may normally perform their own functions. Such a controller 40 may be implemented in the form of hardware, may be implemented in the form of software, or may be implemented in the form of a combination thereof. Preferably, the controller 40 may be implemented as, but not limited to, a microprocessor.

Particularly, the controller 40 may perform a variety of control in a process of determining sensitivity and a detection speed corresponding to an operation mode (e.g., an interior detection mode or an exterior detection mode) of the radar 20 provided in the vehicle and controlling the radar 20 based on the determined sensitivity and the determined detection speed. Herein, the controller 40 may operate in the interior detection mode, when obtaining an opening and closing signal (an open and close signal) of a door from a door system 200 of FIG. 1, in a state where it is connected to the vehicle network via the vehicle network access device 30.

For example, the controller 40 may operate in the interior detection mode, when the door of the vehicle is opened and closed, and may operate in the exterior detection mode, when not operating the interior detection mode. In this case, the controller 40 may first operate in an ROA mode among interior detection modes, when the door of the vehicle is opened and closed, and may then operate in a PPN mode, when the ROA mode is ended. Of course, the controller 40 may first operate in the PPN mode among the interior detection modes, when the door of the vehicle is opened and closed, and may then operate in the ROA mode, when the PPN mode is ended.

As another example, the controller 40 may operate in the PPN mode in a parked state.

The controller 40 may adjust sensitivity and a detection speed of the radar 20 based on a table stored in a storage 10 of FIG. 2. Hereinafter, the operation of the controller 40 will be described in detail with reference to Table 1 above.

When operating the radar 20 in the ROA mode during the interior detection modes, the controller 40 may control the radar 20 to enable all TX antennas and all RX antennas provided in an antenna for interior detection and may control the radar 20 to detect an infant (or a pet) at a detection speed of a first level using a full bandwidth.

When operating the radar 20 in the PPN mode during the interior detection modes, the controller 40 may control the radar 20 to enable all the TX antennas (e.g., three antennas) and all the RX antennas (e.g., four antennas) provided in the antenna for interior detection and may control the radar 20 to detect a position of a passenger at a detection speed of a second level using the full bandwidth. In this case, because the radar 20 should store 12-channel data, the amount of buffer is large.

When operating the radar 20 in a high-speed mode during exterior detection modes, the controller 40 may control the radar 20 to enable some of TX antennas and RX antennas provided in an antenna for exterior detection and may control the radar 20 to detect an object at a detection speed of a third level using a partial bandwidth. In this case, when the distance from the object is sharply reduced, the controller 40 may operate in the high-speed mode. For example, when a separation distance from the object decreases to a threshold (e.g., 10 m for 1 second) or more, the controller 40 may operate in the high-speed mode. Furthermore, the controller 40 may control the radar 20 to enable, for example, two TX antennas and two RX antennas. In this case, because the radar 20 should store 4-channel data, the amount of buffer is not large.

When operating the radar 20 in a low-speed mode during the exterior detection modes, the controller 40 may control the radar 20 to enable some of the TX antennas and the RX antennas provided in the antenna for exterior detection and may control the radar 20 to detect an object at a detection speed of a second level using the partial bandwidth. In this case, when the distance from the object is gently reduced, the controller 40 may operate in the low-speed mode. For example, when the separation distance from the object decreases to less than the threshold (e.g., 10 m for 1 second), the controller 40 may operate in the low-speed mode. Furthermore, the controller 40 may control the radar 20 to enable, for example, one TX antennas and two RX antennas. In this case, because the radar 20 stores 2-channel data, the amount of buffer is small.

Figure 4:
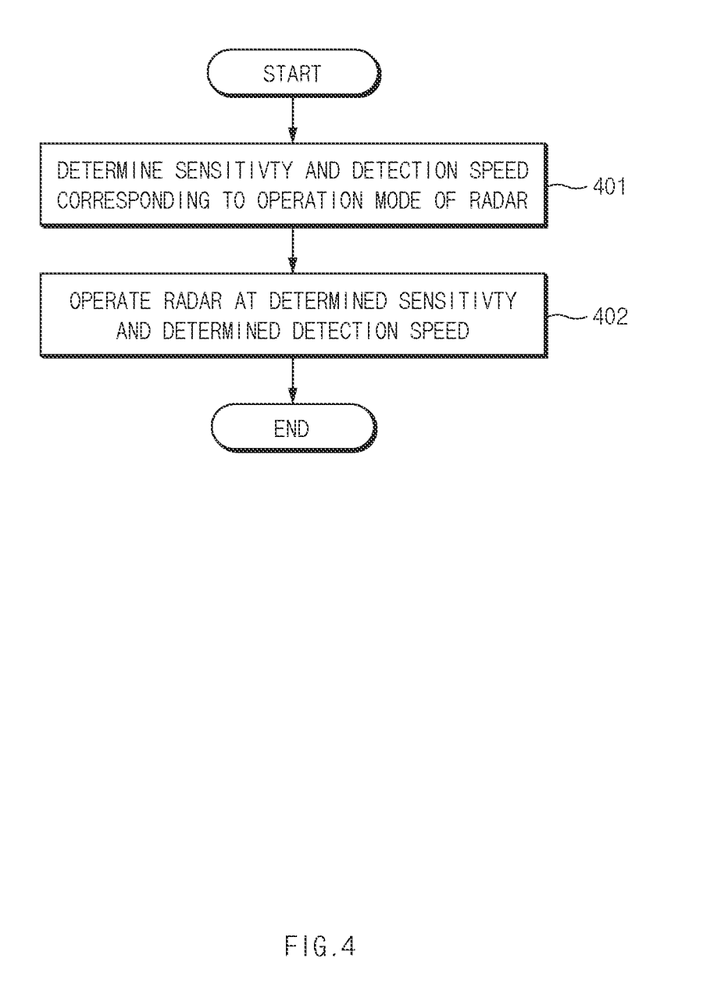
FIG. 4 is a flowchart illustrating a radar control method for a vehicle according to an embodiment of the present disclosure.

FIG. 4 is a flowchart illustrating a radar control method for a vehicle according to an embodiment of the present disclosure.

First, in operation 401, a controller 40 of FIG. 2 may determine sensitivity and a detection speed corresponding to an operation mode of a radar 20 of FIG. 2.

In operation 402, the controller 40 may operate the radar 20 at the determined sensitivity and the determined detection speed.

Figure 5:
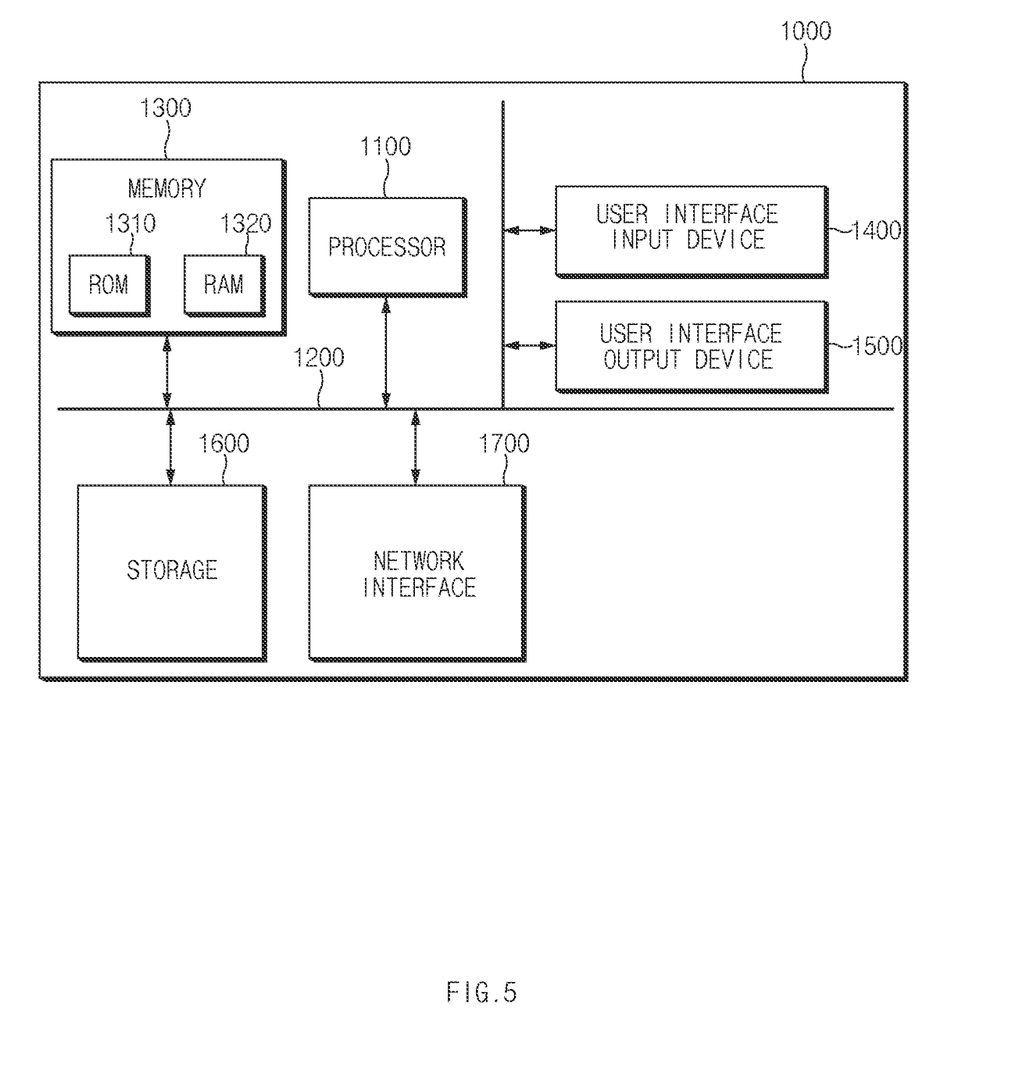
FIG. 5 is a block diagram illustrating a computing system for executing a radar control method for a vehicle according to an embodiment of the present disclosure.

FIG. 5 is a block diagram illustrating a computing system for executing a radar control method for a vehicle according to an embodiment of the present disclosure.

Referring to FIG. 5, the above-mentioned radar control method for the vehicle according to an embodiment of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The radar controller for the vehicle and the method thereof according to an embodiment of the present disclosure may be provided to determine sensitivity and a detection speed corresponding to an operation mode (e.g., an interior detection mode or an exterior detection mode) of the radar provided in the vehicle and control the radar based on the determined sensitivity and the determined detection speed, thus using one radar for various purposes.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A radio detecting and ranging (radar) controller for a vehicle, the radar controller comprising:
 a radar configured to detect a passenger located inside the vehicle, and an obstacle located outside the vehicle; and
 a controller configured to determine sensitivity and a detection speed corresponding to an operation mode of the radar, and to control the radar to operate at the determined sensitivity and the determined detection speed;
 wherein the radar includes:
  an antenna for interior detection including a plurality of transmit antennas and a plurality of receive antennas; and
  an antenna for exterior detection including a plurality of transmit antennas and a plurality of receive antennas,
 wherein the controller enables the antenna for interior detection when operating the radar in interior detection modes, and enables the antenna for exterior detection when operating the radar in exterior detection modes;
 wherein the controller enables all transmit antennas and enables all receive antennas provided in the antenna for interior detection when operating the radar in the interior detection modes, and controls the radar to detect a position of a passenger using a full bandwidth; and
 wherein the controller enables some of the transmit antennas and enables some of the receive antennas provided in the antenna for exterior detection when operating the radar in the exterior detection modes, and controls the radar to detect an obstacle using a partial bandwidth.

2. The radar controller of claim 1, wherein the controller enables all transmit antennas and all receive antennas provided in the antenna for interior detection when operating the radar in a rear occupant alert (ROA) mode among the interior detection modes, and controls the radar to detect a passenger at a detection speed of a first level using a full bandwidth.

3. The radar controller of claim 1, wherein the controller enables all transmit antennas and all receive antennas provided in the antenna for interior detection when operating the radar in a passenger position notification (PPN) mode among the interior detection modes, and controls the radar to detect a position of a passenger at a detection speed of a second level using a full bandwidth.

4. The radar controller of claim 1, wherein the controller enables some of transmit antennas and receive antennas provided in the antenna for exterior detection when operating the radar in a high-speed mode among the exterior detection modes, and controls the radar to detect an obstacle at a detection speed of a third level using a partial bandwidth.

5. The radar controller of claim 1, wherein the controller enables some of transmit antennas and receive antennas provided in the antenna for exterior detection when operating the radar in a low-speed mode among the exterior detection modes, and controls the radar to detect an obstacle at a detection speed of a second level using a partial bandwidth.

6. The radar controller of claim 1, wherein the controller operates the radar in the interior detection modes when a door of the vehicle is opened and closed.

7. A radar control method for a vehicle, the radar control method comprising:
 determining, by a controller, sensitivity and a detection speed corresponding to an operation mode of a radar; and
 operating, by the controller, the radar at the determined sensitivity and the determined detection speed;
 wherein the radar includes:
  an antenna for interior detection including a plurality of transmit antennas and a plurality of receive antennas; and
  an antenna for exterior detection including a plurality of transmit antennas and a plurality of receive antennas;
 wherein the operating of the radar includes:
  enabling the antenna for interior detection when operating the radar in an interior detection mode; and
  enabling the antenna for exterior detection when operating the radar in an exterior detection mode;
 wherein the enabling of the antenna for interior detection includes:
  enabling all transmit antennas and enabling all receive antennas provided in the antenna for interior detection; and
  controlling the radar to detect a passenger using a full bandwidth;
 wherein the enabling of the antenna for exterior detection includes:
  enabling some of the transmit antennas and enabling some of the receive antennas provided in the antenna for exterior detection; and
  controlling the radar to detect an obstacle using a partial bandwidth.

8. The radar control method of claim 7, wherein the enabling of the antenna for interior detection includes:
 enabling all transmit antennas and all receive antennas provided in the antenna for interior detection; and
 controlling the radar to detect a passenger at a detection speed of a first level using a full bandwidth.

9. The radar control method of claim 7, wherein the enabling of the antenna for interior detection includes:
   enabling all transmit antennas and all receive antennas provided in the antenna for interior detection; and
   controlling the radar to detect a position of a passenger at a detection speed of a second level using a full bandwidth.

10. The radar control method of claim 7, wherein the enabling of the antenna for exterior detection includes:
    enabling some of transmit antennas and receive antennas provided in the antenna for exterior detection; and
    controlling the radar to detect an obstacle at a detection speed of a third level using a partial bandwidth.

11. The radar control method of claim 7, wherein the enabling of the antenna for exterior detection includes:
    enabling some of transmit antennas and receive antennas provided in the antenna for exterior detection; and
    controlling the radar to detect an obstacle at a detection speed of a second level using a partial bandwidth.

12. A radar controller for a vehicle, the radar controller comprising:
    a radar having an antenna for interior detection including a plurality of transmit antennas and a plurality of receive antennas, and an antenna for exterior detection including a plurality of transmit antennas and a plurality of receive antennas;
    a table storing sensitivity and a detection speed of the radar for each of a rear occupant alert (ROA) mode and a passenger position notification (PPN) mode among interior detection modes and each of a high-speed mode and a low-speed mode among exterior detection modes, the ROA mode, the PPN mode, the high-speed mode, and the low-speed mode being operation modes of the radar; and
    a controller configured to enable the antenna for interior detection when operating the radar in the interior detection modes, enable the antenna for exterior detection when operating the radar in the exterior detection modes, and control the sensitivity and the detection speed of the radar based on the table;
    wherein the controller enables all transmit antennas and enables all receive antennas provided in the antenna for interior detection when operating the radar in the interior detection modes, and controls the radar to detect a position of a passenger using a full bandwidth; and
    wherein the controller enables some of the transmit antennas and enables some of the receive antennas provided in the antenna for exterior detection when operating the radar in the exterior detection modes, and controls the radar to detect an obstacle using a partial bandwidth.

13. The radar controller of claim 12, wherein the controller enables all transmit antennas and all receive antennas provided in the antenna for interior detection when operating the radar in the ROA mode, and controls the radar to detect a passenger at a detection speed of a first level using a full bandwidth.

14. The radar controller of claim 12, wherein the controller enables all transmit antennas and all receive antennas provided in the antenna for interior detection when operating the radar in the PPN mode, and controls the radar to detect a position of a passenger at a detection speed of a second level using a full bandwidth.

15. The radar controller of claim 12, wherein the controller enables some of transmit antennas and receive antennas provided in the antenna for exterior detection when operating the radar in the high-speed mode, and controls the radar to detect an obstacle at a detection speed of a third level using a partial bandwidth.

16. The radar controller of claim 12, wherein the controller enables some of transmit antennas and receive antennas provided in the antenna for exterior detection when operating the radar in the low-speed mode, and controls the radar to detect an obstacle at a detection speed of a second level using a partial bandwidth.

* * * * *